United States Patent
Lantz et al.

(10) Patent No.: US 9,190,088 B2
(45) Date of Patent: Nov. 17, 2015

(54) ALIGNING A FIRST ELEMENT COUPLED TO AN ACTUATOR WITH A SECOND ELEMENT OF A MAIN SYSTEM

(71) Applicant: International Business Machines Corporation, Armonk, NY (US)

(72) Inventors: Mark A. Lantz, Rueschlikon (CH); Angeliki Pantazi, Rueschlikon (CH); Tomas Tuma, Rueschlikon (CH)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/453,227

(22) Filed: Aug. 6, 2014

(65) Prior Publication Data

US 2015/0062747 A1    Mar. 5, 2015

(30) Foreign Application Priority Data

Aug. 30, 2013   (GB) .................................... 1315472.9

(51) Int. Cl.
*G11B 5/584*   (2006.01)

(52) U.S. Cl.
CPC ...................................... *G11B 5/584* (2013.01)

(58) Field of Classification Search
None
See application file for complete search history.

(56) References Cited

U.S. PATENT DOCUMENTS

| | | | |
|---|---|---|---|
| 5,828,514 A | | 10/1998 | Chliwnyj et al. |
| 5,872,672 A | | 2/1999 | Chliwnyj et al. |
| 5,946,159 A | * | 8/1999 | Chliwnyj et al. .......... 360/77.12 |
| 6,690,531 B2 | * | 2/2004 | Richards et al. ........... 360/77.12 |
| 6,798,607 B2 | * | 9/2004 | Chliwnyj et al. .......... 360/77.12 |
| 6,798,608 B2 | * | 9/2004 | Chliwnyj et al. .......... 360/77.12 |
| 6,831,806 B2 | * | 12/2004 | Chliwnyj et al. .......... 360/77.12 |
| 6,833,973 B2 | * | 12/2004 | Chliwnyj et al. .......... 360/77.12 |

(Continued)

FOREIGN PATENT DOCUMENTS

| | | |
|---|---|---|
| EP | 0463883 A2 | 1/1992 |
| EP | 1675103 A1 | 6/2006 |

OTHER PUBLICATIONS

Evangelos Eleftheriou, "Nanopositioning for Storage Applications*," Annual Reviews in Control, vol. 36, Issue 2, Dec. 2012, pp. 244-254.

(Continued)

*Primary Examiner* — Wayne Young
*Assistant Examiner* — James L Habermehl
(74) *Attorney, Agent, or Firm* — Cantor Colburn LLP

(57) ABSTRACT

A control system for aligning a first element coupled to an actuator with a second element of a main system includes a position sensor that measures an absolute position of the first element relative to the main system as a sensor signal, a position error signal-based compensator that generates a second control signal as a function of a position error signal, wherein the position error signal indicates a relative position of the first element as a difference between the actual position of the first element and a target position of the first element relative to the second element, a sensor-based compensator that generates a first control signal as a function of the sensor signal and the second control signal, and an actuator that changes the position of the first element relative to the second element dependent on the first control signal to align the first element with the second element.

19 Claims, 7 Drawing Sheets

(56) References Cited

U.S. PATENT DOCUMENTS

| | | | |
|---|---|---|---|
| 6,839,197 B2* | 1/2005 | Chliwnyj et al. | 360/77.12 |
| 6,903,895 B2* | 6/2005 | Chliwnyj et al. | 360/77.12 |
| 7,230,788 B2* | 6/2007 | Goker et al. | 360/75 |
| 7,299,146 B2* | 11/2007 | Chliwnyj | 702/106 |
| 8,059,362 B2 | 11/2011 | Hancock et al. | |
| 8,068,308 B2 | 11/2011 | Fujita et al. | |
| 8,587,892 B2* | 11/2013 | Eleftheriou et al. | 360/77.12 |
| 8,643,975 B2* | 2/2014 | Cherubini et al. | 360/76 |
| 8,891,198 B2* | 11/2014 | Bui et al. | 360/77.12 |
| 2004/0130818 A1 | 7/2004 | Chliwnyj et al. | |
| 2012/0307401 A1 | 12/2012 | Bui et al. | |

OTHER PUBLICATIONS

R. Nagao, et al., "Dynamic Tape Path Alternation with Novel Rotary Guider," Microsystem Technologies, vol. 17, Issue 5-7, Jun. 2011, pp. 1243-1250.

Pantazi, et al., "Track-Following in tape Storage: Lateral Tape Motion and Control," Mechatronics, vol. 22, Issue 3, Apr. 2012, pp. 361-367.

Intellecutal Property Office UK, Application No. GB1315472.9; Patents Act 1977: Search Report Under Section 17(5); Mailing Date: Feb. 27, 2014, pp. 1-3.

* cited by examiner

ALIGNING A FIRST ELEMENT COUPLED TO AN ACTUATOR WITH A SECOND ELEMENT OF A MAIN SYSTEM

FOREIGN PRIORITY

This application claims priority to Great Britain Patent Application No. 1315472.9, filed Aug. 30, 2013, and all the benefits accruing therefrom under 35 U.S.C. §119, the contents of which in its entirety are herein incorporated by reference.

BACKGROUND

The invention relates to a device and to a method for aligning a first element coupled to an actuator with a second element of a main system, using a position sensor and considering environmental vibrations.

In many technical systems using actuators, the performance of these actuators, and thus the overall performance of the technical systems, can be influenced by vibrations being induced to the systems and actuators from the outside as external, environmental vibrations and internal vibrations occurring at the actuator or at an element the actuator is coupled with. However, the performance of any technical systems using actuators has increased considerably and is desired to be increased further. Thus, an accurate positioning of actuators may be required to achieve an increased performance.

For example in modern tape storage systems, the capacity and performance of the tape storage systems have increased in the last years. To achieve higher cartridge or tape capacities and improved performance, however, further advances in several areas are necessary. Increases in linear and track densities on the tape may be required in order to achieve higher storage capacities. However, increase in linear densities may lead to a decrease of the distance between adjacent bit cells, which in turn may lead to an increase of inter-symbol interferences. Increase in track densities may lead to narrower individual track widths and narrower write and/or read heads which may require a very precise control of the tape transport system and track-follow control of the tape head.

To achieve the required track densities, precise positioning of the recording head over the data tracks may be required. Therefore, the performance of the track-follow control system of tape drives needs to be improved. Furthermore, operation of tape drive systems requires robust performance of the track-follow control system under shock and vibration conditions. Increasing the tape track density tightens further the tolerance in the acceptable track following error making it increasingly more challenging to meet the performance specifications under vibration conditions.

The basic function of the track-follow control system is to reduce the misalignment between the tape and the recording head created by lateral motion of the flexible medium. Lateral tape motion (LTM) arises primarily from imperfections in the tape guide rollers and reels, such as run-outs, eccentricities and other tape path imperfections.

Besides compensating for the LTM, the track-follow control system should provide an additional functionality of compensating for the external vibration disturbances. Conventionally, standard vibration profiles are used to describe the vibration specifications in terms of the acceleration input under which the tape drive must continue to operate reliably.

A track-follow control system can use a position error signal (PES) that is generated based on servo information prerecorded on the tape. The PES provides a measure of the error between the target track location on the tape and the head position. Several approaches have been proposed for improving performance under vibration condition by enhancing the PES-based track-follow controller. For example, the PES-based track-follow controller can provide an enhanced rejection at the vibration frequencies. Further, switching controllers, accelerometer measurements and disturbance observer enhancements could be used to improve the performance under vibration conditions. Controllers in this context refer to devices for controlling an actuator being responsible for actuating the head, i.e., to change the position of the head. For different vibration conditions, different controllers should be used, i.e., controllers having configurations customized to the current vibration condition. Depending on the vibration condition, the control signal for the actuator can be generated and adjusted so that the vibration condition is considered when actuating the head. However, in order to consider different vibration conditions, the kind of controller can be chosen, i.e., switching between different controllers can be performed.

Another approach for improvements in the track-following performance is to provide a higher closed-loop bandwidth, i.e., increasing the bandwidth within the control system. For higher closed-loop bandwidth, it might be necessary to either increase the physical head actuator bandwidth or increase the PES-based closed-loop bandwidth. The first approach is limited due to a large head actuator mass and power consumption or dissipation constraints. The second approach is limited due to measurement delay effects especially at low speeds and due to noise or disturbance amplification areas.

Therefore, there are several limitations in improving the track-following that is based only in the PES measurement. The same limitations applies to other technical systems using actuators wherein the PES refers to a difference between a target position of the actuator, or an element coupled to the actuator, and the actual actuator position, or element position.

Currently solutions for track-follow control systems use PES and modify the control signal which depends on the PES by considering vibration signals like LTM or by reducing noise in the system. A system using PES and considering LTM is for example disclosed in U.S. Pat. No. 8,059,362 B2. A system using PES and reducing noise in the system is for example disclosed in U.S. Pat. No. 8,068,308 B2.

SUMMARY

In one embodiment, a control system for aligning a first element coupled to an actuator with a second element of a main system includes a position sensor configured to measure an absolute position of the first element relative to the main system as a sensor signal; a position error signal-based compensator configured to generate a second control signal as a function of a position error signal, wherein the position error signal indicates a relative position of the first element as a difference between the actual position of the first element and a target position of the first element relative to the second element; a sensor-based compensator configured to generate a first control signal as a function of the sensor signal and the second control signal; and an actuator configured to change the position of the first element relative to the second element dependent on the first control signal in order to align the first element with the second element.

In another embodiment, a tape transport system includes a head coupled to an actuator, the head operable to read data from and/or write data to a tape; and a control system configured to align the head to the tape. The control system includes a position sensor configured to measure an absolute position of the head relative to the tape transport system as a sensor signal; a position error signal-based compensator configured to generate a second control signal as a function of a position error signal, wherein the position error signal indicates a relative position of the head as a difference between the actual position of the head and a target position of the head relative to the tape; a sensor-based compensator configured to generate a first control signal as a function of the sensor signal and the second control signal; and an actuator configured to change the position of the head relative to the tape dependent on the first control signal in order to align the head with the tape.

In another embodiment, a method of aligning a first element coupled to an actuator with a second element of a main system includes measuring an absolute position of the first element relative to the main system as the sensor signal; generating a second control signal as a function of a position error signal, wherein the position error signal indicates a relative position of the first element as a difference between the actual position of the first element and a target position of the first element relative to the second element; generating a first control signal as a function of the sensor signal and the second control signal; and changing the position of the first element relative to the second element dependent on the first control signal in order to align the first element with the second element.

In still another embodiment, a non-transitory, computer readable storage medium having computer readable instructions stored thereon that, when executed by a computer, implement a method of computer program comprising a program code for executing the method of aligning a first element coupled to an actuator with a second element of a main system. The method includes measuring an absolute position of the first element relative to the main system as the sensor signal; generating a second control signal as a function of a position error signal, wherein the position error signal indicates a relative position of the first element as a difference between the actual position of the first element and a target position of the first element relative to the second element; generating a first control signal as a function of the sensor signal and the second control signal; and changing the position of the first element relative to the second element dependent on the first control signal in order to align the first element with the second element.

In the following, embodiments of methods and devices relating to track-follow control are described with reference to the enclosed drawings. It should be noted that these embodiments also apply to other technical systems using actuators, for example for actuating a robotic arm.

BRIEF DESCRIPTION OF THE SEVERAL VIEWS OF THE DRAWINGS

Similar or functionally similar elements in the figures have been allocated the same reference signs if not otherwise indicated.

DETAILED DESCRIPTION

Figure 1:
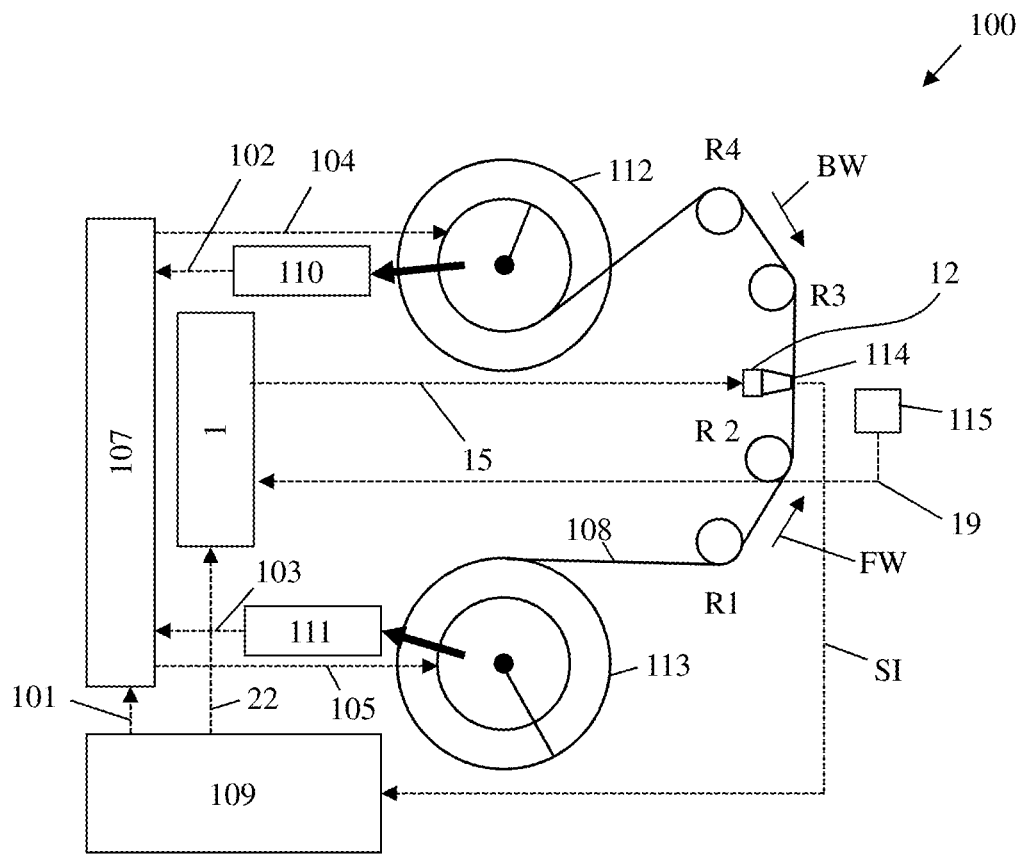
FIG. 1 shows a schematic block diagram of an embodiment of a tape transport system comprising a track-follow control system.

According to an embodiment of a first aspect a control system for aligning a first element being coupled to an actuator with a second element of a main system is suggested. The control system comprises a position sensor for measuring an absolute position of the first element relative to the main system as a sensor signal, a position error signal-based compensator for generating a second control signal as a function of a position error signal, wherein the position error signal indicates a relative position of the first element as a difference between the actual position of the first element and a target position of the first element relative to the second element, a sensor-based compensator for generating a first control signal as a function of the sensor signal and the second control signal, and an actuator for changing the position of the first element relative to the second element dependent on the first control signal in order to align the first element with the second element.

In technical systems, actuators are used to actuate, i.e., to move, apparatuses like robots or parts of them like robotic arms, which may correspond to the first element. In such systems, robotic arms have to perform precise operations on elements, for example circuits or the like, which may correspond to the second element. Due to decreasing sizes of these second elements, the accuracy of the positioning of the robotic arms will have to be improved. However, vibrations being induced to the technical systems affect the accuracy of such actuators.

According to embodiments of the herein described control system, the absolute position of the first element is monitored and measured by an external position sensor. Absolute position means that the position of the first element is not determined based on a computation as a function of different signals but measured based on an external sensor which provides a determination of an absolute position within the main system.

The position sensor provides a sensor signal to a sensor-based compensator, which generates a first control signal. The first control signal is used to drive the actuator to change the position of the first element. The vibrations that may be induced to the actuator can be measured using the external position sensor that measures the absolute position of the actuator relative to the main system.

In the following, a specific example for a control system being usable in a tape transport system will be described. In tape transport systems, the tape is transported through a tape path from a cartridge reel to a take-up reel, or vice versa. Guiding through the tape path and across a head is performed by rolling elements, so called rollers. The head is coupled to an actuator, and dedicated servo transducers at the head read preformatted servo track information. Such a tape transport system includes two main control systems, one for tape transport and one for track-follow. A tape transport control system is responsible for the transport of the tape within the tape transport system.

One main task of the track-follow control system is to position the head actuator with high accuracy on the centerline of the data tracks, in particular in the presence of lateral tape motion (LTM) and/or other external disturbances. The positioning accuracy of the track-follow control system may allow an increase of the tape track density. The relative position of the head with respect to the tape, and thus also the accuracy, can be influenced by different parts of the tape transport system or can be influenced from the outside. For instance, the LTM creates misalignment of the head elements relative to the data track locations. Besides LTM, other factors can impact the track-follow performance like vibrations being induced due to environmental disturbances, like vibrations of the whole tape transport system, one example being building vibrations. Such vibrations are also taken into account in the herein described control system used as a track-follow control system.

The position to be controlled may be a lateral position of the head relative to a longitudinal direction of the tape. Due to the environmental vibrations, the position of the head relative to or with respect to the tape may vary in lateral position. "Lateral" in this context may denote a direction being more or less perpendicular to the direction of the movement or transport of the tape. The position sensor may be arranged within the tape drive system and may measure the position of the head as an absolute position relative to the tape drive.

The control system may further comprise a position error signal-based compensator for generating the second control signal as a function of a position error signal, wherein the position error signal indicates a relative position of the first element as a difference between the actual position of the first element and a target position of the first element relative to the second element, wherein the sensor-based compensator is adapted to generate the first control signal as a function of the sensor signal and the second control signal.

A position error signal (PES) is generated indicating a relative position of the first element as a difference between a target position and an actual position of the first element relative to the second element. The actual position may be determined based on information derived from the second element like a position signal in the form of a feedback signal.

A PES-based compensator may generate a second control signal as a function of the PES. The second control signal indicates a position to which the actuator should move the first element. As a function of the second control signal and the position sensor signal, the sensor-based compensator generates the first control signal for controlling the actuator.

According to an embodiment, the control system is adapted to determine the first control signal in a first control loop depending on a vibration frequency domain profile indicative of environmental vibrations induced to the main system.

These vibrations have to be taken into account when generating the first control signal. Therefore, a vibration frequency domain profile may be used which is indicative of environmental vibrations. Based on this vibration frequency domain profile, the control system uses a first control loop that takes into account the information from the vibration frequency domain profile in the generation of the first control signal. Control loop means that an output signal from the actuator is used as input signal to the sensor-based compensator. Thus, the influences deriving from external vibrations are reduced within this first control loop.

The track-follow control system may be adapted to take into account environmental vibrations, which influence the position of the tape and the head relative to each other. The first control signal, which controls the actuator to change the position of the head, is determined by taking into account disturbances which are caused by the environmental vibrations or other vibrations of the tape transport system. Vibrations across all speeds may be taken into account and compensated using the vibration frequency domain profile. This vibration frequency domain profile may comprise information about vibrations in dependence on the location, where the tape transport system is used or a general specification under which conditions the tape drive is required to function.

The position sensor may be arranged within the tape drive system and may measure the position of the head as an absolute position relative to the tape drive. Thus, disturbances influencing the position of the head within the tape drive may be taken into account in the first control loop when generating the first control signal.

According to a further embodiment, the control system is adapted to determine the second control signal in a second control loop depending on a lateral motion signal indicative of a lateral motion of the element.

The position of the second element in relation to the first element may be affected by movements of the second element. In order to reduce influences to the accuracy of the positioning between the first element and the second element, these movements may be taken into account when generating the first control signal. The control system comprises two control loops, the first control loop taking into account external vibrations and the second control loop taking into account lateral motions of the second element.

In a tape transport system, the PES may be created during track-follow as a function of the servo pattern on the tape and is used to measure the misalignment of the head relative to the data track locations. Subsequently, the PES is used by the herein described track-follow control system to position the head using the actuator to follow the data tracks in the presence of tape disturbances. The PES can be calculated by adding or subtracting the actual or estimated relative position of the head, i.e., the feedback signal of the track-follow control system, to or from a track reference signal. The track reference signal comprises information in view of the target position of the head relative to the tape. The relative position of the head with respect to the tape is calculated as a function of the recorded servo pattern, which includes magnetic transitions with two different slopes. The position can be calculated from the relative timing of pulses generated by the head reading the servo pattern, i.e., the magnetic transitions. The PES-based compensator can generate the second control signal in order to minimize the PES. Thus, the second control signal comprises information about a new position of the head being calculated in relation to the PES.

The relative position of the head with respect to the tape can be influenced by different parts of the tape transport system or can be influenced from the outside. For instance, the LTM creates misalignment of the head elements relative to the data track locations. Sources of the LTM, which is the main contributor to the PES, are mainly imperfections of the rollers and reels, such as run-outs, eccentricities and other tape path characteristics. The first two effects can appear as stationary and time-varying periodic disturbances in the track-follow control system. Furthermore, in flangeless tape drives, low-frequency disturbances are created as additional contribution to LTM. Flangeless refer to the fact that, in tape transport systems, the tape is transported using rollers, which can be designed without flanges for restricting the lateral motion of the tape. Due to the missing motion restriction at the rollers, larger amplitude disturbances may be created due to the movement of the tape at the reels.

Using a first control loop and a second control loop, the track-follow control system is adapted to take into account the LTM and other environmental vibrations, which influence the position of the tape and the head relative to each other. The characteristics of these influences are used to determine the first control signal forwarded to the actuator as a function of the second control signal.

According to a further embodiment, the second control loop comprises a feedback loop for providing a feedback signal to an input of the control system, the feedback signal depending on a difference of an actuator position signal and the lateral motion signal, in order to generate the position error signal.

As the overall control system is arranged as a closed-loop controller, the feedback signal depending on the difference of the actuator position signal and the lateral motion signal may be forwarded to an input of the control system and is used for generating the PES as described above. The feedback signal comprises information about an estimated relative position of the first element with respect to the second element calculated by the difference of an actual position of the first element, i.e., the position signal of the actuator, and the lateral position of the second element.

According to a further embodiment, the control system is adapted to determine the second control signal such that the actuator position signal follows the lateral motion signal.

According to this embodiment, the second control signal is adapted to control the actuator, being used by the first control signal, in a way that the position signal of the actuator follows the lateral motion signal. Thus, the position of the actuator and thus the position of the first element follows the position of the second element which varies due to the lateral motion, for example a lateral tape motion.

According to a further embodiment, the control system is adapted to determine the second control signal by adjusting the actuator position signal relative to the lateral motion signal by enhancing the actuator position signal at predefined frequencies.

Thus, a disturbance rejection may be enhanced at predefined frequencies. The lateral motion signal may have characteristics in frequency areas which need to be more compensated than other areas. The controller may adjust the whole actuator position signal, but with an enhanced amplitude at the predefined frequencies.

In the case of a tape transport system, the predefined frequencies may include roller rotation frequencies and/or harmonics of these frequencies. The roller rotation may cause enhanced disturbances at specific frequencies due to periodic inaccuracies of the rollers. These specific frequencies may be addressed by the disturbance rejection at predefined frequencies corresponding to the specific frequencies due to the roller rotation.

The predefined frequencies may also depend on the operating tape speed, i.e., the speed of the tape measured at the head. Thus, the disturbances caused by roller rotation may vary with the operating tape speed. Therefore, the attenuation of these disturbances at the corresponding frequencies may also vary with the operating tape speed. An input parameter for the adjustment of the actuator position signal may therefore be the operating tape speed.

According to a further embodiment, the control system is adapted to determine the position error signal depending on a system delay using a system delay model.

According to this embodiment, the second control signal is determined by taking into account the system delay. The system delay may be for example a delay due to a reaction delay of the actuator system.

For example, the control system as a track-follow control system may be adapted to calculate the system delay as a function of a servo pattern delay of the tape and an actuator delay. The servo pattern delay is speed-dependent and corresponds to a delay of the servo-pattern. The servo pattern delay increases with decreasing speed as the movement of the tape is too low so that the head might not be able to read the servo-pattern in a time as necessary. Further, the system delay may be induced due to an actuator delay which is speed-independent. The actuator delay may be caused due to a sampling time of the control system or limited bandwidth of the actuator driver circuitry. The system delay may be considered for generating the second control signal.

According to a further embodiment, the sensor-based compensator and the position error signal-based compensator are integrated in one controller.

The one single controller receives all input signals of both compensators, i.e., the PES and the sensor signal. Internally, the controller performs the generation of the first control signal as a function of the second control signal based on the PES and as a function of the sensor signal. The single controller outputs the first control signal to the actuator.

According to a further embodiment, the position sensor is a high-bandwidth position sensor.

The position sensor may be adapted to measure the position of the actuator with a high bandwidth, i.e., a high resolution over time.

According to a further embodiment, the position sensor is a low noise position sensor.

The noise signal of the position sensor that is added to the sensor measurement signal would affect the control system. Therefore, the position sensor is a low noise position sensor generating low noise being added to the sensor measurement signal.

According to a further embodiment, the position sensor is a magnetoresistance sensor, in particular a giant magnetoresistance-based sensor.

One example of a position sensor is a giant magnetoresistance-based (GMR) sensor. Also other kind of sensors like optical sensors may be used.

According to an embodiment of a second aspect, a tape transport system is suggested. The tape transport system comprises a head operable to read data from and/or write data to a tape, and a control system as described above for aligning the head being coupled to an actuator with the tape.

According to an embodiment, the control system is a track-follow control system.

Thus, the control system controls that the actuator, and therefore the head, follows the track on the tape. In this case, the lateral motion may correspond to a lateral tape motion (LTM), i.e., a motion of the tape in a lateral direction as explained above.

According to an embodiment of a third aspect, a method for aligning a first element being coupled to an actuator with a second element of a main system is suggested. The method comprises measuring an absolute position of the first element relative to the main system as a sensor signal, generating a second control signal as a function of a position error signal, wherein the position error signal indicates a relative position of the first element as a difference between the actual position of the first element and a target position of the first element relative to the second element, generating a first control signal as a function of the sensor signal and the second control signal, and changing the position of the first element relative to the second element dependent on the first control signal in order to align the first element with the second element.

According to an embodiment of a fourth aspect, a computer program is suggested. The computer program comprises a program code for executing the method as described above for aligning a first element being coupled to an actuator with a second element of a main system when run on at least one computer.

The program code may be configured to implement further aspects or steps of the method for allocating energy to devices. The program code can be distributed among the elements forming the system.

The computer program product, for instance, includes computer readable code for implementing aspects of the method for aligning a first element being coupled to an actuator with a second element of a main system, like a tape transport system having a head as depicted above.

Certain embodiments of the presented control system, the tape transport system, the control method or the computer program may comprise individual or combined features, method steps or aspects as mentioned above or below with respect to exemplary embodiments.

FIG. 1 shows a tape transport system 100 which is used for transporting a tape 108 in order to perform read, write, seek, or other operations on the tape 108. The tape transport system 100 has a head 114 operable to read data from and/or write data to the tape 108. An outboard reel 113 and an inboard reel 112 are used to transport or move the tape 108 from the outboard reel 113 to the inboard reel 112 in forward direction (FW), and from the inboard reel 112 to the outboard reel 113 in reverse or backward direction (BW). The tape 108 is guided over rollers R1-R4. Sensors 110 and 111 can be used to provide secondary velocities 102, 103 or other reel information measured by the sensors 110 and 111. The secondary velocities 102, 103 correspond to velocities of the tape 108 at the respective reel 112, 113. The sensors 110, 111 can be for example Hall sensors. The arrow FW denotes a nominal forward direction of the tape 108, and BW a movement in the reverse direction. In forward mode, the outboard reel 113 functions as a supply reel. Tape 108 is supplied from the outboard reel 113, via rollers R1, R2 to the head 114 via rollers R3, R4 to the inboard reel 112, which functions as the take-up reel, where tape 108 is wound up again. The tape 108 runs along a forward path as indicated.

The head 114 reads servo information SI from the tape 108. The servo information SI is provided to a servo channel 109. The servo channel 109 provides a primary velocity 101 derived from the servo information SI to a tape-transport control 107. In addition, the servo channel 109 provides data 22 relating to the servo information SI to a track-follow control system 1, which is implemented to adjust the position of the head 114 inter alia in response to this information by forwarding a first control signal 15 to an actuator 12 being coupled to the head 114. The actuator 12, which will be described later in greater detail, is controlled by means of the control signal 15. The tape-transport control 107 is adapted to control the inboard reel 112 and the outboard reel 113 via control signals 104, 105. The control signals 104, 105 may comprise for instance information about the speed of the reels 112, 113.

As a high track density on the tape 108 is desirable in order to achieve a higher capacity, the tolerance in the acceptable position error for read/write operations is relatively low. Thus, a high performance of the track-follow control system 1 is desirable. As already described, the track-follow control system 1 is responsible for controlling and adjusting the position of the head 114 relative to the tape 108. Thus, the track-follow control system 1 reduces the misalignment between the tape 108 and the head 114.

However, there may occur other disturbances causing misalignments between the tape 108 and the head 114. Main disturbances in the track-follow control system 1 are the lateral tape motion (LTM) that arises primarily from imperfections in the tape guide rollers R1-R4 and reels 112, 113 and vibration disturbances induced from the outside. The vibration disturbances can be caused by environmental vibrations, like shakes of the tape transport system 100 due to movements of the tape transport system 100 or quakes of the environment like earthquakes.

Figure 2:
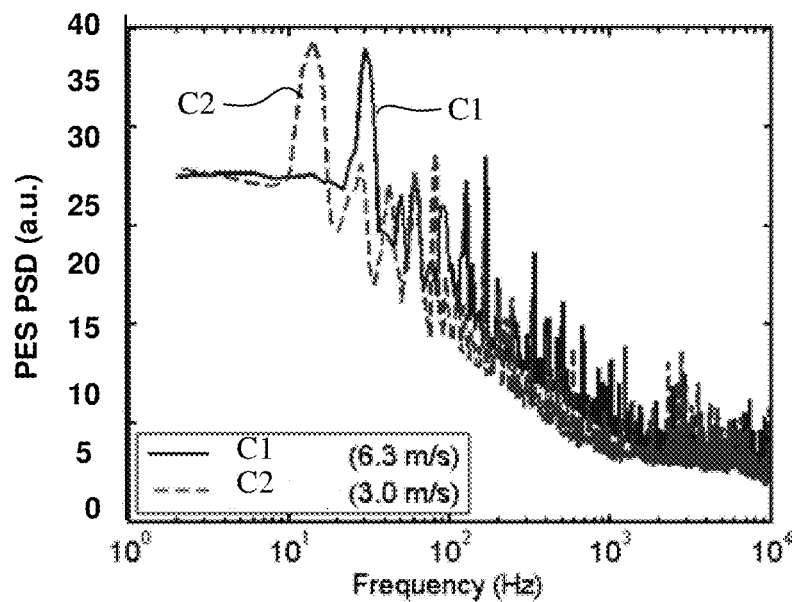
FIG. 2 shows graphs illustrating the power spectral density of lateral tape motion at different speeds.

Exemplary LTMs are shown in FIG. 2. The measurements are taken using the position error signal (PES) while keeping the actuator in a fixed position. As can be seen, the two curves C1, C2 are examples for different operating speeds of the tape. C1 illustrates an LTM at 6.3 m/s and C2 illustrates an LTM at 3.0 m/s. The diagram shows the position error signal (PES) as power spectral density in arbitrary units vs. the frequency. As can be seen, C1 shows an LTM with a peak at about 10 Hz and C2 shows an LTM with a peak at about 30 Hz. These peaks are caused due to reel 112, 113 imperfections. The peak of C1 is at higher frequency compared to the peak of C2 as the LTM is speed-dependent.

Figure 3:
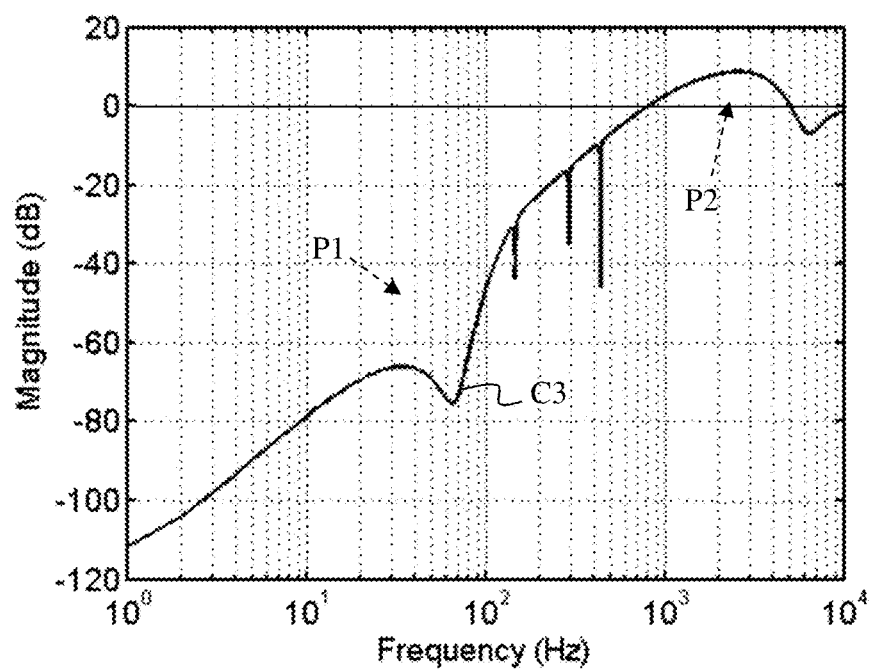
FIG. 3 shows a graph illustrating the magnitude response of error rejection transfer function.

In common systems, the PES is used to generate the control signal 15 to change the position of the actuator 12 and the head 114. The PES is generated based on servo information prerecorded on the tape 108. In order to improve the performance of the track-follow control system 1, common systems try to increase the bandwidth of the head actuator 12 or to increase the bandwidth of the closed-loop control within the track-follow control system 1. However, these approaches have some limitations. In the first approach, the increase of the head actuator 12 may be limited due the large mass of the actuator 12. In the second approach, the increase of the controller bandwidth may be limited due to noise or disturbance amplification areas induced by the PES. This can be seen in FIG. 3, where the curve C3 illustrates a sensitivity function of the PES as magnitude vs. the frequency. As can be seen at point P1, disturbances are reduced. However, with increasing bandwidth, there may be some disturbance amplifications at point P2. This is also called "the waterbed effect".

Figure 4:
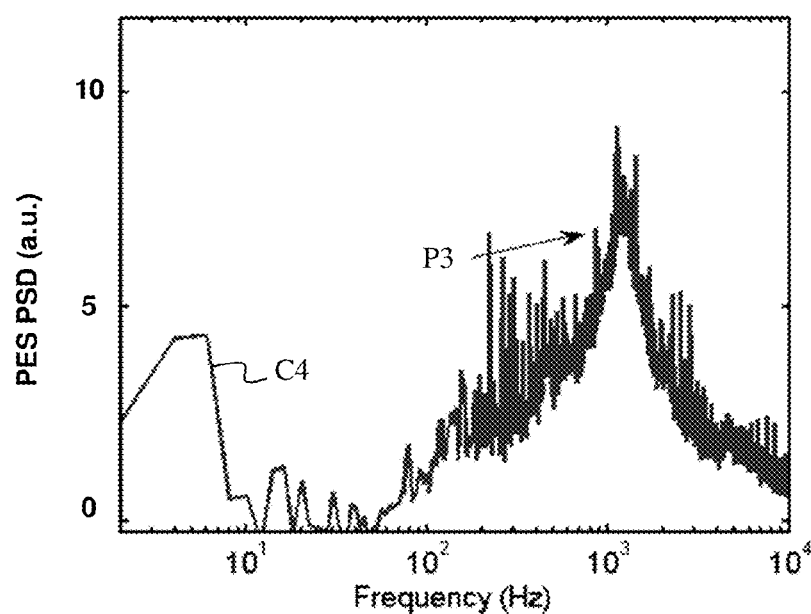
FIG. 4 shows a graph illustrating measuring delay effects during operation using PES.

The increase of the controller bandwidth may be further limited due to measurement delay effects, especially at low speeds. This is shown in FIG. 4, where the curve C4 illustrates the PES power spectral density in arbitrary units vs. the frequency. As can be seen at point P3, the peak is created due to measurement delays in the closed-loop system.

Thus, in order to overcome these limitations, the track-follow control system 1 as described herein is based on a position determination using an external position sensor 115, preferably having a high bandwidth and low noise.

Figure 5:
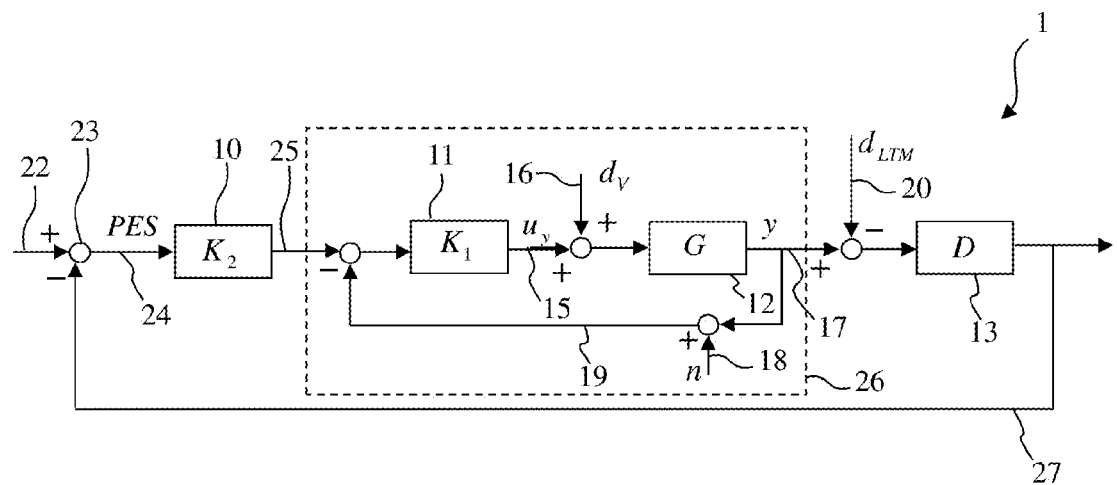
FIG. 5 shows a schematic block diagram of a model of a first embodiment of a track-follow control system.

FIG. 5 shows a first embodiment of the track-follow control system 1. The track-follow control system 1 is arranged in a closed-loop configuration, in particular using two control loops.

The track follow control system 1 receives at an input 23 the track reference 22 from the servo channel module. The PES 24, which is forwarded to the PES-based compensator 10, is calculated as a function, for instance by addition or subtraction, of the track reference 22 and a feedback signal 27. The feedback signal 27 is calculated in the track-follow control system 1 and comprises information about an estimated relative position of the actuator 12 and therefore about an estimated position of the head 114 with respect to the tape position. This feedback signal 27 can also be used in other parts of the tape transport system 100 and is therefore outputted.

In the following, the inner control loop 26 or first control loop 26 and the outer control loop or second control loop of the track-follow control system 1 will be described. The position error signal (PES) 24 that is dependent on preformatted servo patterns, provides a measure of the error between the target track location, i.e., track reference, on the tape 108 and the head position. Based on the PES 24, the PES-based compensator 10 generates a second control signal 25, which is used in common systems as control current $u_y$ for controlling the actuator 12. In the track-follow control system 1, the second control signal 25 is forwarded to a sensor-based compensator 11.

The sensor-based compensator 11 receives a sensor signal 19 from the position sensor 115. The sensor signal 19 measures the position of the actuator 17 but has an additive sensor noise signal 18, which should be low so that negative influences are reduced. The sensor-based compensator 11 generates a first control signal 15 as a function of the second control signal 25 and the sensor signal 19. The first control signal 15 corresponds to the control current $u_y$ comprising a control signal for a movement of the head 114 in y direction, i.e., in a lateral direction with respect to a movement or extension of the tape 108.

In the case of environmental vibrations, the position of the actuator 12 is further dependent on a vibration signal 16 ($d_v$). The vibration signal 16 can be represented or modeled using a vibration frequency domain profile. This profile comprises estimated standard vibrations for different tape transport systems 100, for instance taking into account environmental vibrations caused due to the location of the tape transport system 100. The track-follow control system 1 determines the first control signal 15 taking into account the vibration signal 16. Therefore, the sensor-based compensator 11 enhances the performance under environmental vibrations.

The actuator 12 positions the head 114 due to the control signal 15. The actuator position signal 19 comprises information about the actual head position. This actuator position signal 17 must follow the LTM signal 20 ($d_{LTM}$). The LTM signal 20 induces disturbances to the track-follow control system 1 due to lateral tape motions.

The difference of the actuator position signal 17 and the LTM signal 20 is measured by the servo channel. A system delay unit 13 is used to model the system delay. This system delay unit 13 is optional and can be omitted. The system delay unit 13 affects the relative head position 17 in order to generate a feedback signal 23. The system delay, i.e., the delay caused by the overall system, comprises a servo pattern delay, which is speed-dependent and depends on the servo pattern format and the tape speed, and a sampling time or actuator driver delay, which is speed-independent and depends on the processing or operating speed of the head 114 and the actuator 12.

The feedback signal 27, which comprises information of an estimated relative position of the head actuator 12 with respect to the tape 108, is supplied to the input 23 of the outer closed-loop of the track-follow control system 1. As a function of the feedback signal 27 and the track reference 22, the PES 24 is determined which is supplied to the PES-based compensator 10 as input. The track reference 22 comprises information in view of the target position of the head 114, i.e., at which location of the servo pattern the head 114 should be positioned.

The PES-based compensator 10, the sensor-based compensator 11, the actuator 12 and the system delay unit 13 each comprise logic units $K_2$, $K_1$, G and D. These logic units can be transfer functions used in a control system.

Therefore, the inner control loop 26 takes into account external vibrations 16 and uses a sensor signal 19 from an external position sensor 115. The outer control loop takes into account LTM 20 and uses the PES 24. Thus, a track-follow control system 1 is provided which allows increasing the bandwidth of the inner control loop 26.

Figure 6:
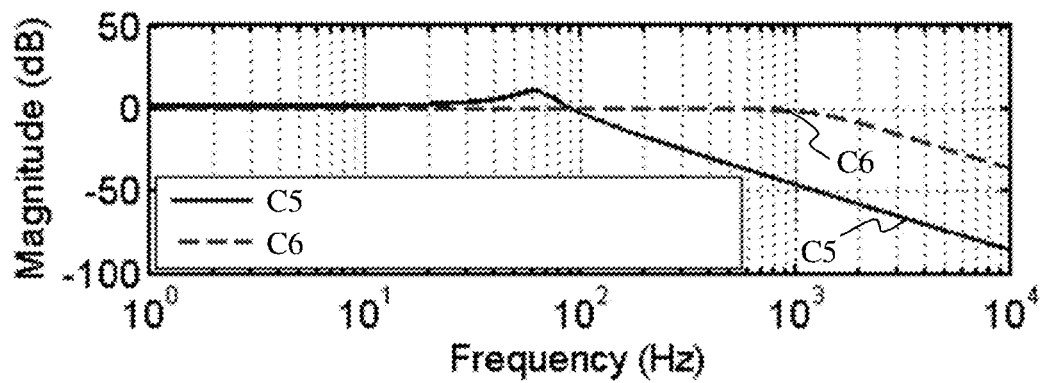
FIGS. 6 and 7 show graphs illustrating transfer functions of the actuator and the first control loop.
Figure 7:
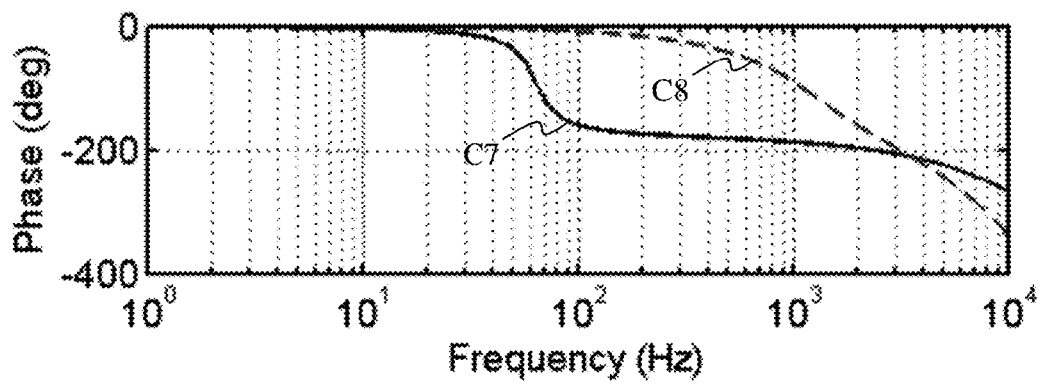

This can be seen for example in FIGS. 6 and 7, which illustrate the magnitude (FIG. 6) and phase (FIG. 7) vs. the frequency measured only at the actuator 12 and in the inner control loop 26. As can be seen, curves C6 and C8 of the inner control loop 26 show improved behavior, i.e., higher magnitude and phase, in comparison to the curves C5 and C7 of the actuator 12.

Figure 8:
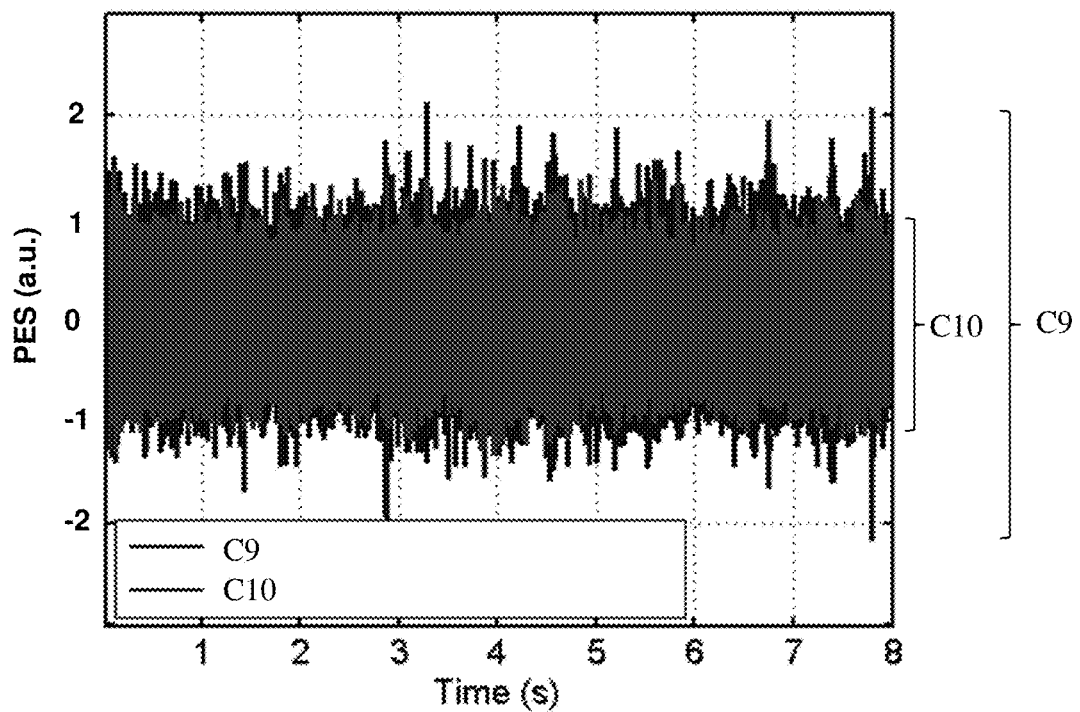
FIG. 8 shows a graph illustrating PES deviation using a common track-follow controller and using the track-follow control system of FIG. 5.

FIG. 8 illustrate simulation results using experimentally captured waveforms and the track-follow control system 1 (C10) and using a PES-only control (C9). As can be seen, the PES (shown in arbitrary units) is decreased using the combined control of the track-follow control system 1.

Figure 9:
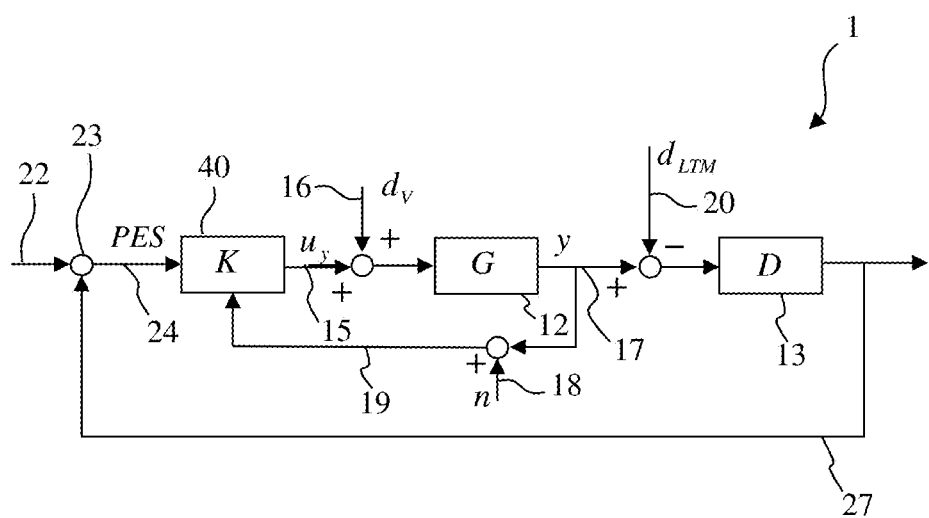
FIG. 9 shows a schematic block diagram of a model of a second embodiment of a track-follow control system.

In a second embodiment of the track-follow control system 1 as shown in FIG. 9, the sensor-based compensator 11 and the PES-based compensator 10 can be combined in one controller 40. The PES 24 and signal 19 are supplied to this combined controller 40 which performs a combined generation of the first control signal 15. This means that the combined controller 40 generates the first control signal 15 based on the PES 24 and the sensor signal 18 at the same time.

Figure 10:
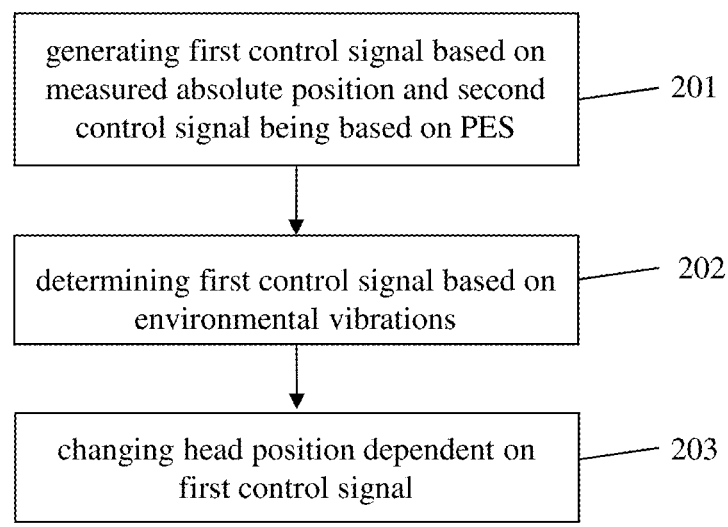
FIG. 10 shows an embodiment of a sequence of method steps for controlling the position of head relative to a tape within a tape transport system.

A method for operating an above described track-follow control system 1 is shown in FIG. 10.

In a first step 201, a first control signal 15 is generated as a function of a sensor signal 19 and a second control signal 25 being generated based on the PES 24. The sensor signal 19 comprises information in view of an absolute position of the head 114 relative to the tape transport system 100.

Using a first control loop 26, the first control signal 15 is determined in a second step 202. The determination of the first control signal 15 depends on a vibration frequency domain profile indicative of environmental vibrations 16 induced to the main system 100. Using a vibration frequency domain profile, influences to signals within the tape transport system 100 may be reduced and thus, the accuracy of the positioning of the actuator 12 and the head 114 relative to the tape 108 may be improved.

In a third step 203, the head position is changed relative to the tape 108 dependent on the first control signal 15. As described, it is important for higher track densities that the misalignment between tracks on the tape 108 and the head 114 is reduced. This is achieved due to the first control loop 26 as provided by the described method, where environmental vibrations are taken into account when generating the first control signal 15 for the actuator 12.

The above described method and also the track-follow control system 1 can be implemented using computerized devices which can be suitably designed for implementing embodiments of the present invention as described herein. In that respect, it can be appreciated that the methods described herein are largely non-interactive and automated. In exemplary embodiments, the method described herein can be implemented either in an interactive, partly-interactive or non-interactive system. The method described herein can be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of above method of FIG. 10 or the track-follow control system 1, e.g., of FIG. 5, may be implemented in software, as an executable program, the latter executed by suitable digital processing devices. More generally, embodiments of the present invention can be implemented, wherein general-purpose digital computers, such as personal computers, workstations, etc., are used.

Figure 11:
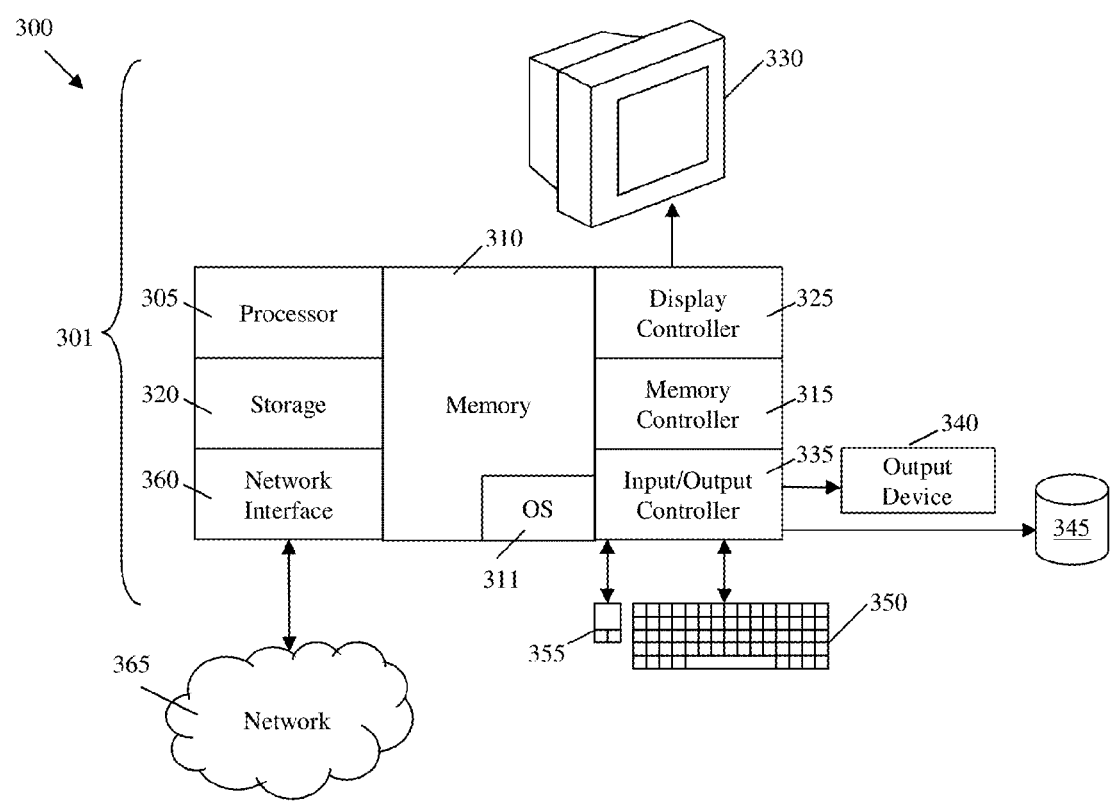
FIG. 11 shows a schematic diagram of an embodiment of a system adapted for controlling the position of the head.

For instance, the system 300 depicted in FIG. 11 schematically represents a computerized unit 301, e.g., a general-purpose computer. In exemplary embodiments, in terms of hardware architecture, as shown in FIG. 18, the unit 301 includes a processor 305, memory 310 coupled to a memory controller 315, and one or more input and/or output (I/O) devices 340, 345, 350, 355 (or peripherals) that are communicatively coupled via a local input/output controller 335. The input/output controller 335 can be, but is not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 305 is a hardware device for executing software, particularly that stored in memory 310. The processor 305 can be any custom made or commercially available processor, a central processing unit (CPU), an auxiliary processor among several processors associated with the computer 301, a semiconductor based microprocessor (in the form of a microchip or chip set), or generally any device for executing software instructions.

The memory 310 can include any one or combination of volatile memory elements (e.g., random access memory) and nonvolatile memory elements. Moreover, the memory 310 may incorporate electronic, magnetic, optical, and/or other types of storage media. Note that the memory 310 can have a distributed architecture, where various components are situated remote from one another, but can be accessed by the processor 305. For instance, different configurations for the compensators 10, 11 or frequency domain profiles or other data can be stored in the memory 310.

The software in memory 310 may include one or more separate programs, each of which comprises an ordered listing of executable instructions for implementing logical functions. In the example of FIG. 11, the software in the memory 310 includes methods described herein in accordance with exemplary embodiments and a suitable operating system (OS) 311. The OS 311 essentially controls the execution of other computer programs, such as the method as described herein (e.g., FIG. 10) or the track-follow control system 1 as described herein (e.g., FIG. 5), and provides scheduling, input-output control, file and data management, memory management, and communication control and related services.

The method described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 310, so as to operate properly in connection with the OS 311. Furthermore, the method can be written as an object oriented programming language, which has classes of data and methods, or a procedure programming language, which has routines, subroutines, and/or functions.

Possibly, a conventional keyboard 350 and mouse 355 can be coupled to the input/output controller 335. Other I/O devices 340-355 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 335 for further processing. Sensor nodes are ideally small, consume low energy, are autonomous and operate unattended.

In addition, the I/O devices 340-355 may further include devices that communicate both inputs and outputs. The system 300 can further include a display controller 325 coupled to a display 330. In exemplary embodiments, the system 300 can further include a network interface or transceiver 360 for coupling to a network 365. For instance, the tape transport system 100 of FIG. 1 may be controlled via a network 365 when used in a tape library.

The network 365 transmits and receives data between the unit 301 and external systems. The network 365 is possibly implemented in a wireless fashion, e.g., using wireless protocols and technologies, such as WiFi, WiMax, etc. The network 365 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 365 can also be an IP-based network for communication between the unit 901 and any external server, client and the like via a broadband connection. In exemplary embodiments, network 365 can be a managed IP network administered by a service provider. Besides, the network 365 can be a packet-switched network such as a LAN, WAN, Internet network, etc.

If the unit 301 is a PC, workstation, intelligent device or the like, the software in the memory 310 may further include a basic input output system (BIOS). The BIOS is stored in ROM so that the BIOS can be executed when the computer 301 is activated. The track-follow control system 1 may be part of the unit 301.

When the unit 301 is in operation, the processor 305 is configured to execute software stored within the memory 310, to communicate data to and from the memory 310, and to generally control operations of the computer 301 pursuant to the software. The methods described herein and the OS 311, in whole or in part are read by the processor 305, typically buffered within the processor 305, and then executed. When the method described herein (e.g., with reference to FIG. 10) is implemented in software, the method can be stored on any computer readable medium, such as storage 320, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 301, partly thereon, partly on a unit 301 and another unit 301, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

USED REFERENCE SIGNS

1 track-follow control system
10 PES-based compensator
11 sensor-based compensator
12 actuator
13 system delay unit
15 first control signal
16 external vibration signal
17 actuator position signal
18 sensor noise signal
19 sensor signal
20 lateral tape motion signal
22 track reference
23 input of the track-follow control system
24 position error signal (PES)
25 second control signal
26 first control loop
27 feedback signal
40 single controller
100 tape transport system
101 primary velocity
102 secondary velocity
103 secondary velocity
104 inboard reel control signal
105 outboard reel control signal
107 tape transport control system
108 tape
109 front-end servo channel module
110 sensor
111 sensor
112 inboard reel
113 outboard reel
114 head
115 position sensor
201-203 method steps
300 system
301 computerized unit
305 processor
310 memory
311 operating system (OS)
315 memory controller
320 storage 325 display controller
340 display
345, 350, 355 input and/or output (I/O) devices
335 local input/output controller
350 keyboard
355 mouse
360 network interface or transceiver
365 network
C1-C10 curves
P1-P3 regions or points on the curves
FW forward direction
BW reverse direction
n noise
R1-R4 roller
SI servo information

The invention claimed is:

1. A control system for aligning a first element coupled to an actuator with a second element of a main system, the control system comprising:
   a position sensor configured to measure an absolute position of the first element relative to the main system as a sensor signal;
   a position error signal-based compensator configured to generate a second control signal as a function of a position error signal, wherein the position error signal indicates a relative position of the first element as a difference between the actual position of the first element and a target position of the first element relative to the second element, and wherein the position error signal is determined depending on a system delay using a system delay model;
   a sensor-based compensator configured to generate a first control signal as a function of the sensor signal and the second control signal; and
   an actuator configured to change the position of the first element relative to the second element dependent on the first control signal in order to align the first element with the second element.

2. The control system of claim 1, further comprising a first control loop configured to determine the first control signal, depending on a vibration frequency domain profile indicative of environmental vibrations induced to the main system.

3. The control system of claim 1, further comprising a second control loop configured to determine the second control signal, depending on a lateral motion signal indicative of a lateral motion of the second element.

4. The control system of claim 3, wherein the second control loop comprises a feedback loop configured to provide a feedback signal to an input of the control system, the feedback signal depending on a difference of an actuator position signal and the lateral motion signal, in order to generate the position error signal.

5. The control system of claim 4, wherein the actuator position signal follows the lateral motion signal.

6. The control system of claim 4, wherein the second control loop determines the second control signal by adjusting the actuator position signal relative to the lateral motion signal by enhancing the actuator position signal at predefined frequencies.

7. The control system of claim 1, wherein the sensor-based compensator and the position error signal-based compensator are integrated in one controller.

8. The control system of claim 1, wherein the position sensor is a high-bandwidth position sensor.

9. The control system of claim 1, wherein the position sensor is a low noise position sensor.

10. A control system for aligning a first element coupled to an actuator with a second element of a main system, the control system comprising:
    a position sensor configured to measure an absolute position of the first element relative to the main system as a sensor signal;
    a position error signal-based compensator configured to generate a second control signal as a function of a position error signal, wherein the position error signal indicates a relative position of the first element as a difference between the actual position of the first element and a target position of the first element relative to the second element;
    a sensor-based compensator configured to generate a first control signal as a function of the sensor signal and the second control signal; and
    an actuator configured to change the position of the first element relative to the second element dependent on the first control signal in order to align the first element with the second element;
    wherein the position sensor is a giant magnetoresistance-based sensor.

11. A tape transport system, comprising:
    a head coupled to an actuator, the head operable to read data from and/or write data to a tape; and
    a control system configured to align the head to the tape, the control system comprising:
    a position sensor configured to measure an absolute position of the head relative to the tape transport system as a sensor signal;
    a position error signal-based compensator configured to generate a second control signal as a function of a position error signal, wherein the position error signal indicates a relative position of the head as a difference between the actual position of the head and a target position of the head relative to the tape, and wherein the position error signal is determined depending on a system delay using a system delay model;
    a sensor-based compensator configured to generate a first control signal as a function of the sensor signal and the second control signal; and
    an actuator configured to change the position of the head relative to the tape dependent on the first control signal in order to align the head with the tape.

12. The tape transport system of claim 11, wherein the control system is a track-follow control system.

13. The control system of claim 11, further comprising a first control loop configured to determine the first control signal, depending on a vibration frequency domain profile indicative of environmental vibrations induced to the main system.

14. The control system of claim 11, further comprising a second control loop configured to determine the second control signal, depending on a lateral motion signal indicative of a lateral motion of the second element.

15. The control system of claim 14, wherein the second control loop comprises a feedback loop configured to provide a feedback signal to an input of the control system, the feedback signal depending on a difference of an actuator position signal and the lateral motion signal, in order to generate the position error signal.

16. The control system of claim 15, wherein the actuator position signal follows the lateral motion signal.

17. The control system of claim 15, wherein the second control loop determines the second control signal by adjusting the actuator position signal relative to the lateral motion signal by enhancing the actuator position signal at predefined frequencies.

18. A method of aligning a first element coupled to an actuator with a second element of a main system, the method comprising:
- measuring an absolute position of the first element relative to the main system as the sensor signal;
- generating a second control signal as a function of a position error signal, wherein the position error signal indicates a relative position of the first element as a difference between the actual position of the first element and a target position of the first element relative to the second element;
- determining the position error signal dependent on a system delay using a system delay model;
- generating a first control signal as a function of the sensor signal and the second control signal; and
- changing the position of the first element relative to the second element dependent on the first control signal in order to align the first element with the second element.

19. A non-transitory, computer readable storage medium having computer readable instructions stored thereon that, when executed by a computer, implement a method of computer program comprising a program code for executing the method of aligning a first element coupled to an actuator with a second element of a main system, the method comprising:
- measuring an absolute position of the first element relative to the main system as the sensor signal;
- generating a second control signal as a function of a position error signal, wherein the position error signal indicates a relative position of the first element as a difference between the actual position of the first element and a target position of the first element relative to the second element;
- determining the position error signal dependent on a system delay using a system delay model;
- generating a first control signal as a function of the sensor signal and the second control signal; and
- changing the position of the first element relative to the second element dependent on the first control signal in order to align the first element with the second element.

* * * * *